United States Patent
Katagiri et al.

(10) Patent No.: US 6,749,079 B2
(45) Date of Patent: Jun. 15, 2004

(54) STORAGE BOX HAVING A SLIDING LID

(75) Inventors: Katsuhiro Katagiri, Nishikasugai-gun (JP); Masanobu Muto, Nishikasugai-gun (JP)

(73) Assignee: Toyoda Gosei, Co., LTD, Aichi-ken (JP)

(*) Notice: Subject to any disclaimer, the term of this patent is extended or adjusted under 35 U.S.C. 154(b) by 179 days.

(21) Appl. No.: 09/741,876

(22) Filed: Dec. 22, 2000

(65) Prior Publication Data

US 2001/0020620 A1 Sep. 13, 2001

(30) Foreign Application Priority Data

Dec. 24, 1999 (JP) .............................. 11-367758

(51) Int. Cl.$^7$ .............................................. B65D 43/12
(52) U.S. Cl. .................. 220/345.2; 220/354.1; 220/351; 220/811; 220/813; 224/926; 224/539
(58) Field of Search .......................... 296/24.1, 37.14, 296/37.8; 224/926, 924, 539, 275; 220/345.1, 345.2, 345.4, 351, 324, 811–813

(56) References Cited

U.S. PATENT DOCUMENTS

| | | | | |
|---|---|---|---|---|
| 1,173,558 A | * | 2/1916 | Cosmen et al. ............. | 220/812 |
| 2,338,477 A | * | 1/1944 | Wolters et al. ............. | 220/812 |
| 2,475,896 A | * | 7/1949 | Husted ..................... | 220/345.2 |
| 2,532,830 A | * | 12/1950 | Barnhart et al. ............ | 220/812 |
| 2,661,119 A | * | 12/1953 | Spiess, Jr. et al. .......... | 220/815 |
| 2,791,348 A | * | 9/1957 | Adams ...................... | 220/812 |
| 2,850,760 A | * | 9/1958 | Vanderwalker ............. | 220/812 |
| 3,490,642 A | * | 1/1970 | Friedlander ................ | 220/812 |
| 4,848,627 A | * | 7/1989 | Maeda et al. ............... | 224/275 |
| 5,072,989 A | * | 12/1991 | Spykerman et al. ........ | 296/37.8 |
| 5,397,160 A | * | 3/1995 | Landry ..................... | 224/539 |
| 5,520,313 A | * | 5/1996 | Toshihide .................. | 224/275 |
| 5,533,643 A | * | 7/1996 | Kruzick .................... | 220/812 |
| 5,555,995 A | * | 9/1996 | Galer ....................... | 220/324 |
| 5,620,122 A | * | 4/1997 | Tanaka ..................... | 224/926 |
| 6,045,173 A | * | 4/2000 | Tiesler et al. .............. | 220/813 |
| 6,129,237 A | * | 10/2000 | Miyahara ................... | 220/812 |

FOREIGN PATENT DOCUMENTS

| | | |
|---|---|---|
| JP | 60-95336 | 6/1985 |
| JP | 62-17451 | 2/1987 |
| JP | 63-156851 | 10/1988 |
| JP | 5-338497 | 12/1993 |
| JP | 6-99775 | 4/1994 |
| JP | 6-293240 | 10/1994 |
| JP | 8-52049 | 2/1996 |
| JP | 8-113086 | 5/1996 |

OTHER PUBLICATIONS

Toyoda Gosei Technical Review, vol. 41, No. 1, Jun. 30, 1999.

* cited by examiner

*Primary Examiner*—Robin A. Hylton
(74) *Attorney, Agent, or Firm*—Posz & Bethards, PLC

(57) ABSTRACT

A storage box including a body, a lid and an arm member. The body is provided with a storage portion and a guide portion. The lid is provided with a sliding portion engaged with and directed by the guide portion. The arm member is held rotatably by the body at a first end thereof, and is held rotatably by the lid at a second end thereof. This construction accommodates various loads or forces applied to the lid during opening and closing, thereby decreasing overall strain upon the storage box and eliminating the need to reinforce the body, the lid and the arm member. The result is a functionally simplified yet strengthened storage box capable of being manufactured at reduced costs.

9 Claims, 4 Drawing Sheets

STORAGE BOX HAVING A SLIDING LID

This application claims the benefit of priority of Japanese Patent Application No. 11-367758, filed on Dec. 24, 1999, which is incorporated herein by reference.

BACKGROUND OF THE INVENTION

1. Field of the Invention

The present invention relates to a storage box found in a vehicle. More particularly, the present invention relates to a console box where, among other features, items can be preserved for future retrieval.

2. Description of the Related Art

A storage box is often disposed in an automobile for purposes of storing small articles. Additional automobile amenities that provide for article storage include glove boxes, which are disposed adjacent to a dashboard, center console boxes, which are disposed in the central portion of a passenger compartment, and door pockets, which are disposed inside a door.

Regarding the center console box, a variety of embodiments are disclosed within Japanese Unexamined Patent Publication (KOKAI) No. 5-338,497, Japanese Unexamined Patent Publication (KOKAI) No. 6-293,240, Japanese Unexamined Patent Publication (KOKAI) No. 6-99,775, Japanese Unexamined Patent Publication (KOKAI) No. 8-52,049 and Japanese Unexamined Patent Publication (KOKAI) No. 8-113,086. All of the center console boxes found in these publications provide cover members (i.e. lids) that additionally serve as the opening-and-closing mechanism.

The applicants of the present invention developed a center console box as illustrated in FIG. 5 (Toyoda Gosei Technical Review, Volume No. 41, No. 1, issued on Jun. 30, 1999). This center console box has a lid, which is allowed a wide range of movement to help facilitate item storage and retrieval. After the lid is opened, applying a downward force to the rearward end of the lid rotates and descends the lid preventing the leading end of the lid from rising up to a highly obtrusive position. Accordingly, the lid minimally interferes with the passengers or their seating positions. Thus, such a center console box displays very favorable qualities.

However, since many of the opening and closing mechanisms disclosed in the aforementioned publications are intricate, there are excessive component parts. The result of such complexity requires increased production time which ultimately increases the manufacturing costs. Additionally, this added number of component parts increases the probability of lid malfunction.

Moreover, in the case of the center console box as illustrated in FIG. 5, an active force "F" as illustrated in FIG. 5 may be applied onto the lid before the lid is fully opened and turned rearward. In the instance such a large force acts on the trailing end of the lid, a greater force resulting from the momentum of the large force may place additional stress onto the lid and the sliding portion of the body, leading to increased lid malfunction.

In light of the center console box as illustrated in FIG. 5, it becomes necessary to design the lid by taking into account the extra strength need for the component parts to withstand these greater forces. This may include lid and body material reinforcement. However, when the thickness of the component members is increased, so too is the overall weight which reduces the space available in the body for storage.

SUMMARY OF THE INVENTION

The present invention has been developed in view of the aforementioned shortcomings. An object of the present invention is to provide a storage box, which does not require additional reinforcement, even in the face of greater force applied to the lid during manipulation. A further object of the present invention is to provide a lightweight design with a reduced number of component parts. The result of such an efficient design allows the storage box to be manufactured at lower costs.

In order to achieve the above objects, the inventors of the present invention have developed a lid, which carries out simultaneous translation and rotary movement.

For example, a storage box according to the present invention is characterized in that it comprises a body having a storage portion and a guide portion; a lid having a sliding portion engaged with and directed by the guide portion; and an arm member held rotatably by the body at one of the opposite ends and held rotatably by the lid at the remaining opposite end.

The body of the storage box, according to the present invention, is provided with the guide portion which guides the lid in addition to the storage portion. The lid is directed by the guide portion so that it carries out a translation movement along the body. Further, since the present storage box is provided with the arm member, which is held rotatably by the body at one of the opposite ends and held rotatably by the lid at the remaining opposite end, it is possible for the lid to carry out a rotary movement by way of the arm member moving with respect to the body. Thus, the lid of the present storage box can carry out a rotary movement simultaneously between opening and closing positions. With this structure, even when the lid receives a load at the rearward end during the opening movement, the lid accommodates the load and adjusts by carrying out a rotary movement. Accordingly, even if the lid is subjected to a spontaneous load or force, the lid accommodates the load by shifting rotatably along the body, thereby avoiding undue stress which may lead to lid malfunction. Therefore, it becomes unnecessary to additionally reinforce the lid or body to account for a spontaneous load or force.

Moreover, the lid opens and closes over the storage portion of the body by translation movement, simultaneous with the rotary movement, and does not obstructively protrude out at the rearward end. As a result, the lid fails to interfere with passenger seating and provides an efficient ergonomic feel within the car. In addition, the present storage box utilizes a reduced number of component parts, which decreases manufacture costs.

Note that the present storage box which is disposed inside a vehicle is not limited for vehicles use only, rather the storage box can achieve similar objectives and functions in a variety of environments.

In accordance with the storage box of the present invention, it becomes possible to design the box to be lightweight since traditional reinforcement measures used to strengthen the body or lid to accommodate for unexpected loads are not required. Moreover, the present storage box can be constructed using fewer parts, which reduces the associated manufacturing costs.

BRIEF DESCRIPTION OF THE DRAWINGS

A more complete appreciation of the present invention and many of its advantages will be readily obtained and understood by reference to the following detailed description when considered in connection with the accompanying drawings and detailed specification, all of which form part of the disclosure.

DETAILED DESCRIPTION OF THE PREFERRED EMBODIMENTS

Figure 1:
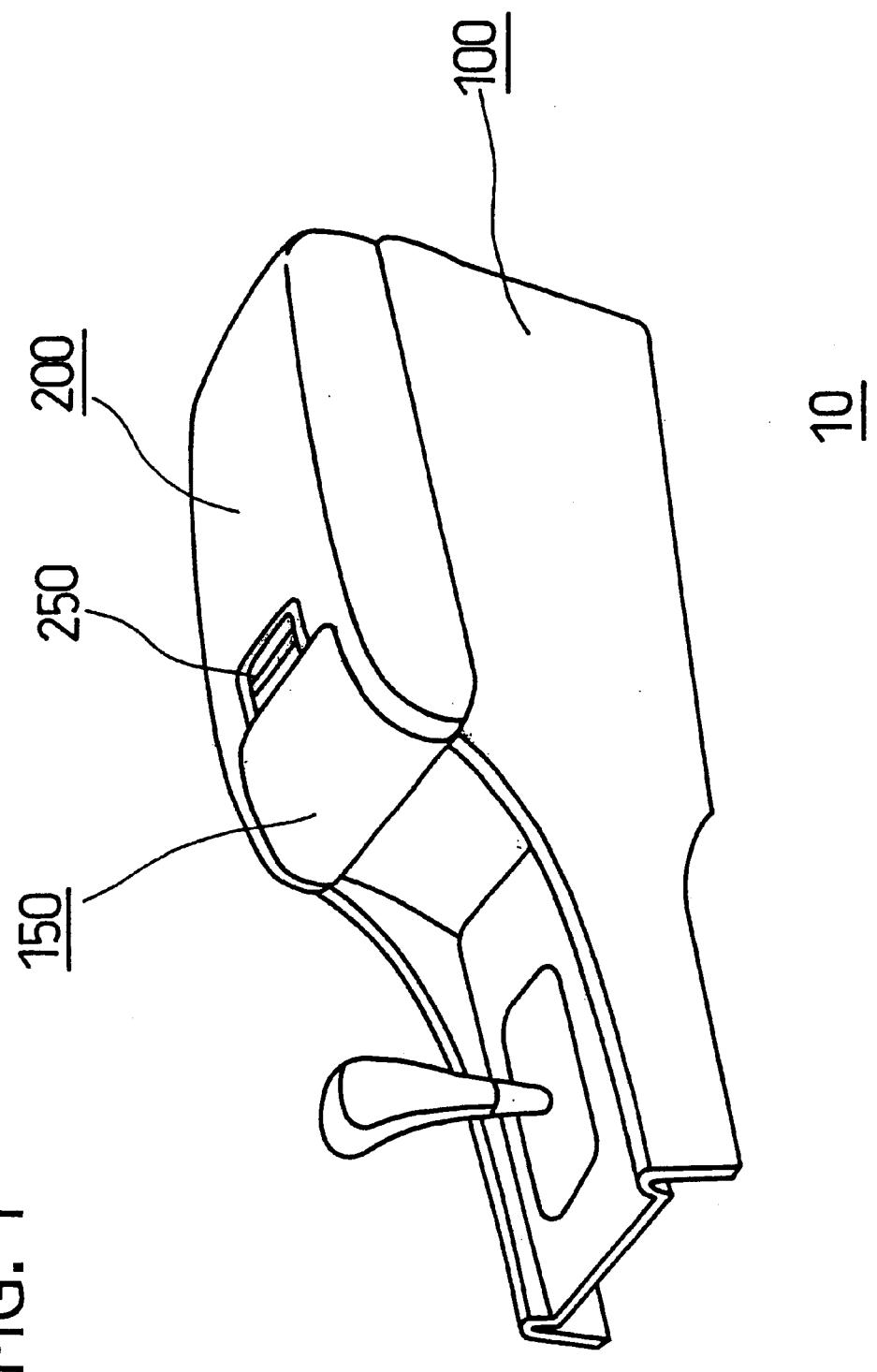
FIG. 1 is a diagram used to illustrate a storage box according to the present invention whose lid is closed.

Having generally described the present invention, a further understanding can be obtained by reference to the specific preferred embodiments which are provided herein for the purpose of illustration only and are not intended to limit the scope of the appended claims.

The present invention will be hereinafter described while showing the specific aspects of the embodiments of a storage box according to the present invention.

(1) Body a) The shape and positioning of the body are not limited, as long as the body is provided with the storage portion and the guide portion. For example, when the body is disposed in an automobile, it is preferable to utilize it as a center console box. However, it is not necessary to independently dispose the body. For instance, the body can be united with an automobile central convexed portion (or an automobile tunnel portion), a center panel, or the like.

b) Further, it is preferred that the body be provided with a holder on an opposite side with respect to an opening direction of the lid. When the body is provided with the holder, it becomes possible to store articles varying in sizes and shapes therein. The body and the holder may be disposed separately in an attempt to more effectively utilize the arrangement space located with the storage portion.

c) The storage portion is a portion for storing articles, and it is possible to vary the different shapes used to form it which include but are not limited to rectangular parallelepiped shapes and elliptic cylinder shapes.

d) The guide portion directs the translation movement of the lid and is not limited to being linearly disposed along the guide portion. In the case where the guide portion is disposed within the body, the guide portion can be formed on a side surface of the storage portion, along a predetermined path. Moreover, the guide portion can be disposed in a position outside the body or along the upper surface of the body, so as to follow along an outer path of the body.

A configuration of the guide portion can be selected from appropriate shapes depending on the respective shape of the sliding portion of the lid, with which the guide portion engages. For example, when the sliding portion is convexed, the guide portion can be formed as slots, grooves, or the like. Additionally, when the sliding portion is concaved, the guide portion can be formed as a convex-shaped rail or the like.

(2) Lid a) The lid provides an opening and closing cover over the storage portion of the storage box. Moreover, when the present invention is applied to an automobile center console box, the lid additionally serves as an arm support.

b) As described above, the sliding portion, which is provided for the lid, engages with the guide portion of the body so that the lid slides along the guide portion, thereby defining the lids translation movement. It is preferable to design the sliding portion and the guide portion with appropriate shapes, allowing for smooth movement along the body.

c) The lid can be further designed to be withdrawn into a position within the body. However, in order to secure the desired capacity and design of the storage portion in the body, it is preferable to dispose the lid as a covering over the body.

(3) Arm Member a) The arm member is a connecting member, which is held rotatably at one end thereof by the body, and is further held rotatably at the opposite end thereof by the lid. The arm member carries out a rotary movement about the fixed portion along the one end which is directly held rotatably by the body, with respect to the body. The opposite end of the arm member is held rotatably by the lid at the opposite end, where the arm member and the guide portion carry out rotary movements about the held portion (i.e., permanent center).

When the movement of the lid is viewed from the body while taking the connecting relationships into consideration, the lid carries out a rotary movement about a point, which is determined by an opening position of the lid with respect to the body.

b) The arm member can take on a variety of different configurations, such as a rod or thin plate, for example. When the arm member is formed as a thin plate, to which a width is given in a longitudinal direction, the preferred space and rigidity are achieved. Further, the arm member can have a linear or a curved shape. Depending on the differences between the lid and the body, the arm member can be formed to accommodate the connection.

The quantity of the arm members utilized in making the connections are not limited and depend on the desired mobility of the lid. For example, one arm member can be supported at opposite ends, to achieve this means. However, two arm members are preferred to be supported at opposite ends.

Furthermore, in order to provide a smooth transition for the lid, a damper mechanism can be disposed between the arm member and the body. The damper mechanism, for instance, can comprise a first gear, which is installed to the body and which rotates against a predetermined resistance, and a second gear, which meshes with the first gear and is installed to the arm member. Since the arm member carries out the rotary movement while meshing with the first and second gears, the lid is afforded a smooth controlled movement.

c) It is preferred that the arm member be provided with a contacting portion, which restrains the opening of the lid through contact with the body, and a supporting portion, which supports the lid.

When the arm member is provided with the contacting portion, it is possible to open the lid while in any position. Further, it is possible to regulate the opening positions of the lid by adjusting the length of the guide portion of the body, along which the sliding portion of the lid engages. The contacting portion also provides a stable restraint when the member is in contact with the body so as to regulate the opening of the lid.

Further, when the opening range of the lid is limited to an appropriate range, it becomes easier to manipulate the lid into an open position. For example, in a center console box of an automobile, when the opening range of the lid is predetermined, the driver does not need to extend his or her hand rearwardly to close the lid, since the lid is preferably within the driver's arm range.

Additionally, since the arm member is further provided with the supporting portion, a load applied to the lid can be accommodated by the supporting portion.

Hereinafter, the present invention will be described in detail with reference to specific embodiments of the storage box according to the present invention.

The following center console box 10 embodiment is only one of many storage box configurations.

Figure 2:
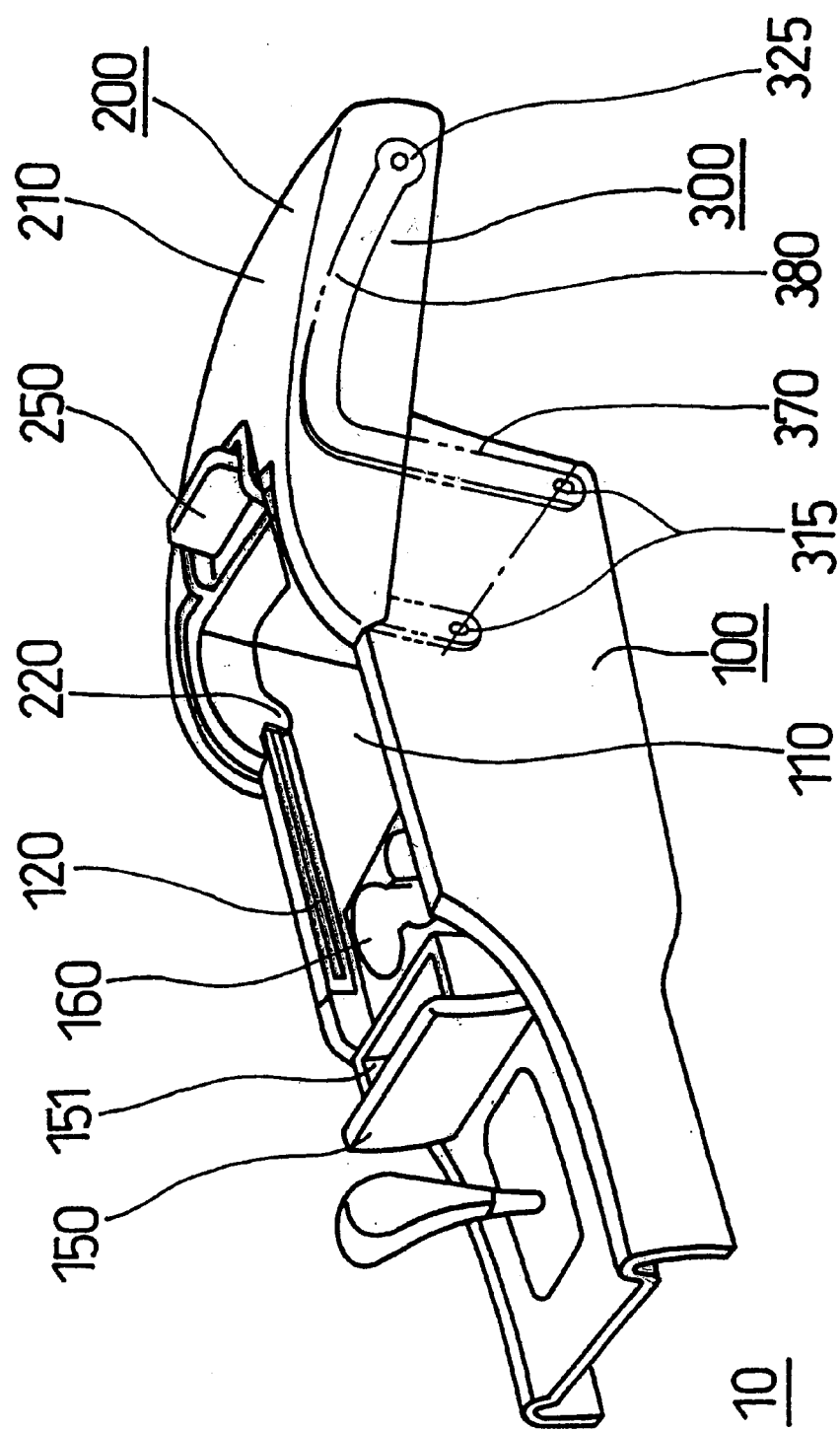
FIG. 2 is a diagram used to illustrate the storage box according to the present invention whose lid is opened.
Figure 3:
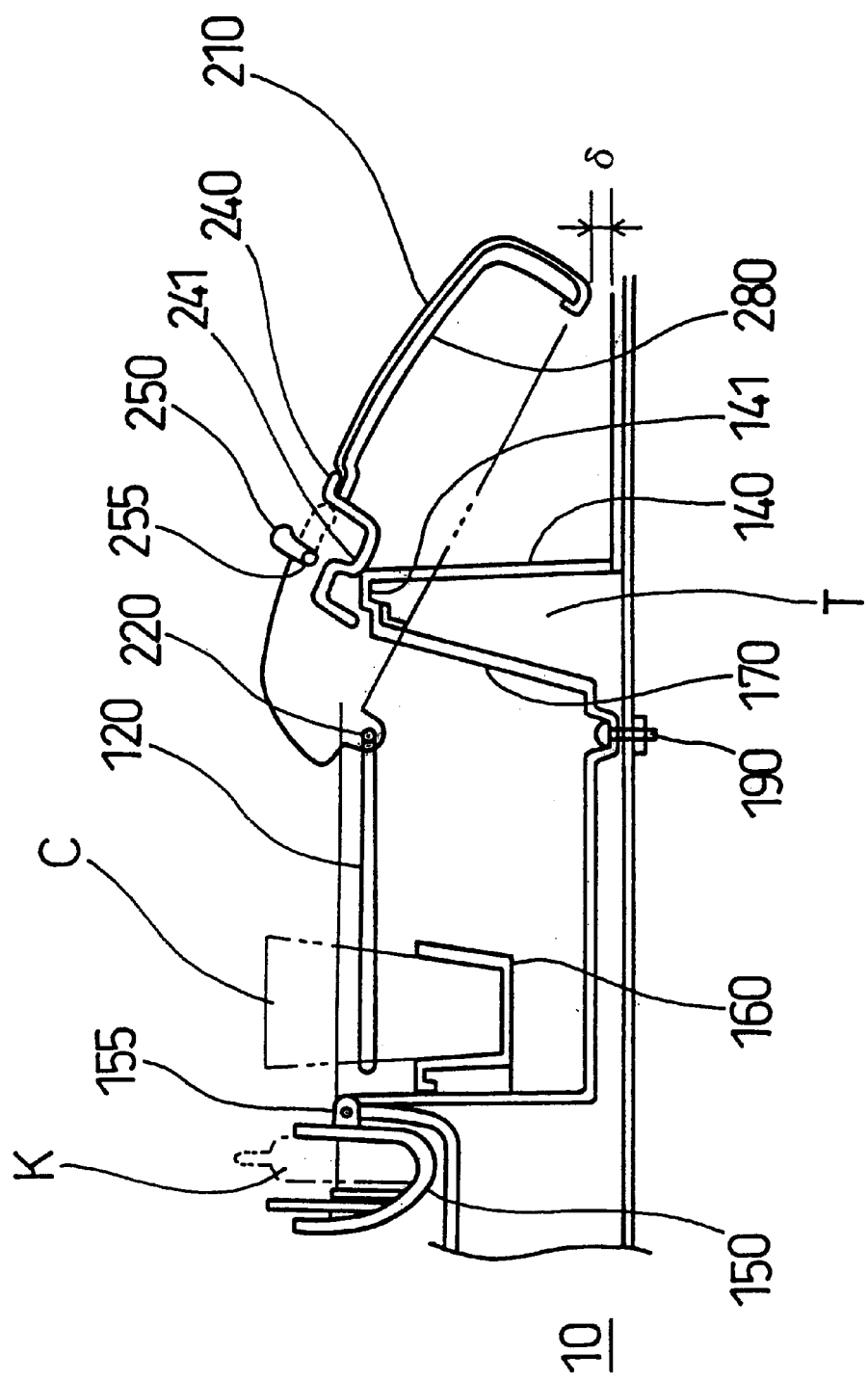
FIG. 3 is a vertical cross-sectional view used to illustrate the storage box according to the present invention whose lid is opened.

The center console box 10 comprises a body 100, a lid 200 and arm members 300 respectively. The appearances of the center console box 10 in the closed and opened states are illustrated in FIG. 1, FIG. 2 and FIG. 3. FIG. 1 illustrates an external appearance of the center console box 10 whose lid 200, in a closed position. FIG. 2 illustrates an external appearance of the center console box 10 whose lid 200, is in an opened position. In particular, FIG. 3 illustrates a vertical cross-sectional view of the center console box 10 whose lid 200, is in an opened position.

Figure 4:
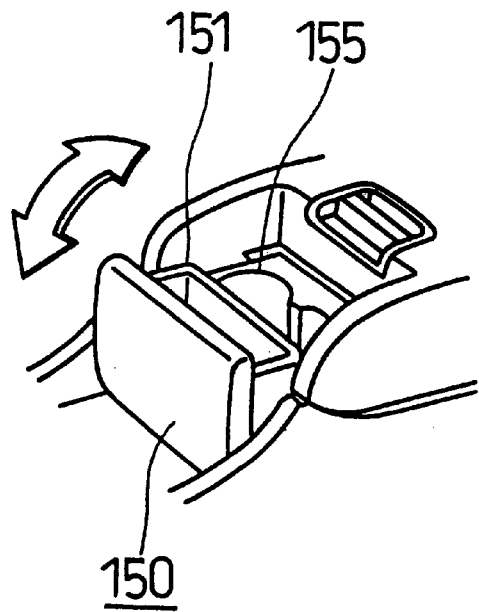
FIG. 4 is a diagram used to illustrate the storage box according to the present invention whose holder is only opened while the lid is closed.
Figure 5:
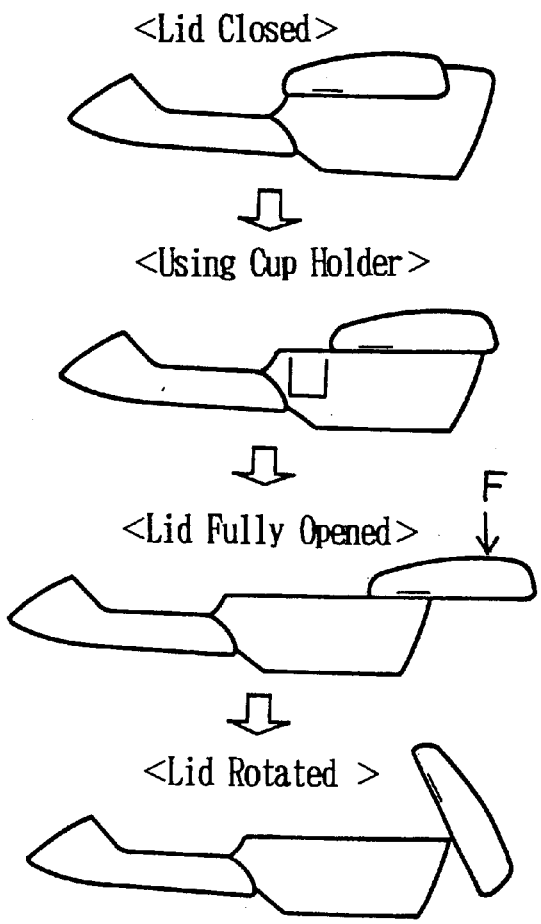
FIG. 5 is a diagram used to illustrate the conventional center console box.

Hereinafter, the storage box according to the present invention will be described with reference to these drawings whenever necessary. Note that FIG. 4 illustrates the center console box 10 whose holder 150, provided for the body 100, is in an opened position while the lid 200 is closed.

(1) Body a) The body 100 is disposed at a position along a center panel, directly rearward to a transmission operation unit placed within the center of a vehicle. The outer side surfaces of the body 100 are integrally connected with the center panel. In the body 100, there is formed a substantially rectangular parallelepiped-shaped storage portion 110, which provides an area for the storage of articles. Along the upper inner side surfaces of the storage portion 110 are disposed guide portions 120, which extend between front and rear directions (consistent with the front and rear of the vehicle). The guide portions 120 are formed as long grooves, and engage with sliding portions 220 of the lid 200 as will be described later.

b) At the trailing or rear end of the storage portion 100, is a contacting surface 170 as illustrated in FIG. 3. At the connecting portion between the contacting surface 170 and a trailing end wall 140 of the body 100, is formed a pop-up projection 141. Further, the body 100 is fastened along a convex-shaped portion to the vehicle body by way of a fastening portion 190, along a bottom surface of the storage portion 110. Note that the space provided by location "T", formed between the contacting surface 170 and the trailing end wall 140, may be substituted with a variety of articles, one of which may include an ash tray.

c) Furthermore, in front of the body 100, there is disposed a rotatable small-sized holder 150, where amenities such as cellular phones "K", cards, and other loose articles may be stored. The holder 150 rotates about a supporting point 155, which is disposed at the leading end portion of the body 100, so that a storage portion 151 of the holder 150 opens outward. Note that the opening of the holder 150 can be performed in synchronization with the opening of the lid 200. However, in this embodiment, the opening of the lid 200 and the opening of the holder 150 are not carried out synchronously thereby allowing manual selection of the holder 150 position.

Moreover, the body 100 is provided with a cup holder 160 along the forward inner side of the storage portion 110. The cup holder 160 is adapted for holding beverage containers "C". More preferably, the cup holder 160 can be provided with a supporting arm, in order that a variety of beverage container sizes can be stably held. The depth of the cup holder 160 is determined by measuring the size, capacities and holding capability of the containers "C".

The center console box 10 of the present invention having a compact design and large storage capacity, is equipped with storage portion 110, holder 150 and cup holder 160. For instance, an example of the efficient design provides an independently opening and closing holder 150. The compact design further includes the cup holder 160 located within the storage portion 110. When the aforementioned holder 160 is not in use, the center console box 10 provides an area to hide the holder 160. Also, when the lid 200 is closed, the holder 150 can rotate freely from the inside to the outside of the lid 200. Accordingly, the center console box 10 of this embodiment provides the functioning and designing properties, which are ergonomically appealing to the passengers.

(2) Lid a) The lid 200 is provided with sliding portions 220, a slide lever 250 and a pop-up restricting fitting 240. At a front portion of the lid 200, the lid 200 is formed in a substantially U-shaped portion. Along the left and right sides of the U-shaped portion, there are formed sliding portions 220. These sliding portions 220 are provided with projections, which engage with the long grooves of the guide portions 120 of the body 100. The front portion of the lid 200 can be directed over and along the top surfaces of the body 100 by way of the projections.

b) The slide lever 250 assists with the opening and closing of the lid 200. The slide lever 250 is disposed along the top outer surface of the lid 200 and rotates about holding points 255 on the top surface of the lid 200. The slide lever 250 provides a support to interchange the lid between open and closed positions. Additionally, the slide lever 250 can be fixed permanently to project outwards. However, in this embodiment, the slide lever 250 is provided with a pop-up mechanism 241.

The pop-up mechanism is formed in the following manner. The slide lever 250 is urged by a torsional coiled spring (not shown) which allows the slide level 250 to project in a forward direction as illustrated in FIG. 3. When the slide lever 250 is projected outward in a forward erected state, the outward front surface of the slide lever 250 is brought into contact with the top surface of an accommodation room, which is formed with the top surface of the lid 200. As a result, the slide lever 250 is prevented from any further outward rotation.

When the slide lever 250 is moved to a closed position, an engagement projection (not shown), disposed on the end of the slide lever 250, engages with the pop-up restricting fitting 240. The slide lever 250 then lies flush, along the top surface of the lid 200. As a result, while the center console box 10 is being used as an arm rest, the driver can comfortably place his or her elbow on the center console box 10 without being hindered by an outward slide lever 250 protrusion along the top surface.

When a driver desires to open the lid 200, he or she can depress the leading end of the slide lever 250 with his or her finger, projecting the slide lever 250 up and out, allowing the driver to effectively grasp the slide lever 250, and pull in a manner away, towards the trailing end wall 140. Therefore, it is not required to fully place the slide lever 250 into an erected state to open the lid 200.

Additionally, if the lid 200 is opened to the trailing end, while the slide lever 250 is in the engaged flush position, a portion of the pop-up restricting fitting 240 which engages the slide lever 250 in place (not shown) thereby releases, breaking the slide lever 250 from its held position. Thereafter, the slide lever 250 automatically springs up and outward, by means of the torsional coiled spring. This allows the driver to pull the slide lever 250 attached to the lid 200 by grasping the projected slide lever 250 with his or her finger. This automatic projection of the slide level 250 allows the driver to easily close the lid 200. At this moment of automatic projection, the slide lever 250 does not outwardly project at an angle greater than 90 degrees allowing for a stable grip during lid 200 closing.

c) Since the top surface of the lid 200 can be utilized as an arm support, a padding layer 210 is disposed thereon. The padding layer 210 includes a facing, which may be comprised of a fiber, a synthetic leather, or other like material in addition to a cushioning material, which may be comprised of polyurethane foam or the like.

Moreover, the lid 200 can be arranged to withdraw to a position inside the body 100 or storage portion 110. However, it is preferred that the lid 200 be formed so as to overlap the top of the body 100 thereby increasing the storage capacity available within the storage portion 110.

(3) Arm Member a) The arm member 300 is a connecting member, held rotatably by the rear lower portion of the body 100 at one of the opposite ends, and further held rotatably by the rear end portion of the lid 200 at the remaining opposite end. By connecting the lid 200 and the body 100 by way of the arm member 300, a so-called slider-crank mechanism is constituted. The component member corresponding to the slider are sliding portions 220 of the lid 200, and the component member corresponding to the crank is the arm member 300. Moreover, the lid 200 can be regarded as another linking member, connecting the sliding portions 220 and the arm member 300.

It is preferred that the lid 200 move along a position substantially parallel to the guide portions 120 of the body 100. Therefore, it becomes necessary to determine the length of the arm member 300, the shape thereof and the positions of the holes, so that the holes 325 of the arm members 300 and the lid 200 come together at the highest point when the lid 200 is closed.

The cross section shape of the arm member 300 can be a rod or a thin plate. However, in this embodiment, the arm member 300 is formed as a thin plate shape to enhance compactness, effectively allowing a larger storage capacity within storage portion 110. The arm member 300 may be formed as a substantially straight component since the movement of the lid 200 is determined by the distance between the holes. In this embodiment, however, the arm member 300 is formed in a dogleg shape so that it crosses over the contacting surface 170 of the storage portion 110. With this arrangement, it is not necessary to secure the arm members 300 along the rear end wall of the storage portion 110.

b) Holes 315, 325 are bored at the opposite ends of the arm members 300 and secured with projections (not shown). The holes 315, are fitted with projections which are formed in the rear lower end of the body 100, which allow the arm members 300 to be disposed rotatably with respect to the body 100. While holes 325 are fitted to projections formed in the rear portion of the lid 200, so that the arm members 300 are disposed rotatably with respect to the lid 200. The arm members 300 alternatively can be secured with pins, or provided with shafts depending on the embodiment. However, integrally formed projections with the body 100 and the lid 200 decrease the number of required component parts. Further, the arm members 300 can be disposed outside the body 100. However, it is preferred that the arm members 300 are disposed inside the body 100. It is most preferred that arm members 300 are disposed between the outer walls of the body 100 and the inner walls of the storage portion 110, to minimize interference. In this embodiment, the arm members 300 are disposed on the left and right sides of the body 100.

c) The respective dogleg-shaped arm members 300 are provided with a contacting portion 370 and a supporting portion 380. When the contacting portions 370 are brought into contact with the contacting surface 170, the lid 200 is inhibited from opening further. As a result, the lid 200 does not open beyond a defined point.

The rear end of the lid 200 can be adjusted to lie in a desired position above a surface found along the convexed portion of the automobile passenger divider. It is preferred that there be a clearance δ between 20 to 30 mm between the top surface of the convexed portion and the rear end of the lid 200. When the clearance is too small, the lid 200 may not be fully opened due to interference with the convexed portion. When the clearance is too large, the body 100, the lid 200 and the arm member 300, need to be comprised of thicker materials in order to accommodate the greater stress levels resulting from larger loads or forces applied to the lid 200. When the clearance is proper, however, the load can be supported between the rear end of the lid 200 and the top surface of the convexed portion.

Moreover, the respective arm members 300 are provided with the supporting portion 380, which supports the lid 200 during the opening of the lid 200. The respective supporting portions 380 are brought into contact with the supporting surface 280, which is placed on the inner side of the lid 200, and thereby support the lid 200 as a whole. In addition, when a load is acted onto the lid 200, the supporting portions 380 help to further stabilize the lid 200.

Having now fully described the present invention, it will be apparent to one of ordinary skill in the art that many changes and modifications can be made thereto without departing from the spirit or scope of the present invention as set forth herein including the appended claims.

What is claimed is:

1. A storage box, comprising:
   a container body having a storage portion and a guide portion;
   a lid having a sliding portion formed at a first portion of the lid and engaged with and directed by the guide portion, said lid comprising a lever mechanism that facilitates opening and closing of the lid along the guide portion, wherein the lever mechanism is rotatably connected to the lid and rotates between a first position, flush with the lid, and a second position, projecting from the lid, and the lever mechanism is biased toward the second position and further comprises a fitting that selectively retains the lever mechanism in the first position; and
   an arm member connected at a first end thereof to the body and connected at a second end thereof to the lid.

2. The storage box of claim 1, wherein the arm member is rotatably connected at the first end to the body and rotatably connected at the second end to the lid.

3. The storage box of claim 1, wherein the body comprises a holder on a side opposite the storage portion.

4. The storage box of claim 3, wherein the holder is rotatably connected to the body to rotate between an open position and a closed position.

5. The storage box of claim 3, further comprising a container holder between the storage portion and the holder.

6. A storage box, comprising:
   a container body having a storage portion and a guide portion;
   a lid having a sliding portion formed at a first portion of the lid and engaged with and directed by the guide portion; and
   an arm member connected at a first end thereof to the body and connected at a second end thereof to the lid, wherein the arm member is formed in a substantially dogleg shape wherein:
   the body comprises a holder on a side opposite the storage portion; and
   the holder is rotatably connected to the body to rotate between an open position and a closed position.

7. The storage box of claim 6, wherein the arm member is rotatably connected at the first end to the body and rotatably connected at the second end to the lid.

8. A storage box, comprising:
a container body having a storage portion and a guide portion, wherein the body comprises a holder on a side opposite the storage portion;
a lid having a sliding portion formed at a first portion of the lid and engaged with and directed by the guide portion;
an arm member connected at a first end thereof to the body and connected at a second end thereof to the lid, wherein the arm member is formed in a substantially dogleg shape; and
a container holder between the storage portion and the holder.

9. The storage box of claim 8, wherein the arm member is rotatably connected at the first end to the body and rotatably connected at the second end to the lid.

* * * * *